United States Patent
Dultz et al.

(10) Patent No.: US 6,813,424 B1
(45) Date of Patent: Nov. 2, 2004

(54) OPTICAL COMMUNICATIONS LINK

(75) Inventors: Wolfgang Dultz, Frankfurt am Main (DE); Gisela Dultz, Frankfurt am Main (DE); Erna Frins, Montevideo (UY); Heidrun Schmitzer, Regensburg (DE)

(73) Assignee: Deutsche Telekom AG Bonn (DE)

( * ) Notice: Subject to any disclaimer, the term of this patent is extended or adjusted under 35 U.S.C. 154(b) by 0 days.

(21) Appl. No.: 09/786,826

(22) PCT Filed: Aug. 5, 1999

(86) PCT No.: PCT/EP99/05664

§ 371 (c)(1),
(2), (4) Date: Jun. 15, 2001

(87) PCT Pub. No.: WO00/14579

PCT Pub. Date: Mar. 16, 2000

(30) Foreign Application Priority Data

Sep. 9, 1998 (DE) ........................ 198 41 068

(51) Int. Cl.[7] .............................. G02B 6/44
(52) U.S. Cl. ...................... 385/123; 385/123
(58) Field of Search ......................... 385/123

(56) References Cited

U.S. PATENT DOCUMENTS

| | | | |
|---|---|---|---|
| 4,934,787 A | * | 6/1990 | Ichimura et al. ............ 385/123 |
| 5,298,047 A | * | 3/1994 | Hart et al. .................... 65/432 |
| 5,311,346 A | | 5/1994 | Haas et al. .................. 359/156 |
| 5,408,545 A | | 4/1995 | Lee et al. ..................... 385/11 |
| 5,418,881 A | * | 5/1995 | Hart et al. ................... 385/123 |
| 5,452,394 A | * | 9/1995 | Huang ......................... 385/123 |
| 5,613,028 A | | 3/1997 | Antos et al. ................ 385/123 |
| 5,701,376 A | | 12/1997 | Shirasaki ..................... 385/123 |
| 5,822,487 A | * | 10/1998 | Evans et al. ................ 385/123 |

FOREIGN PATENT DOCUMENTS

| | | |
|---|---|---|
| DE | 38 42 036 | 6/1990 |
| EP | 0 393 237 | 8/1989 |
| EP | 0 582 405 | 2/1994 |
| EP | 0 646 819 | 4/1995 |

OTHER PUBLICATIONS

Haldane, F.D.M., "Path dependence of the geometric rotation of polarization in optical fibers", Optics Letters, vol. 11, No. 11, Nov. 1986; pp. 730–732.

Petrov, N.I., "Evolution of polarization in an inhomogeneous isotropic medium", Journal of Experimental and Theoretical Physics, vol. 85, No. 6, Dec. 1997; pp. 1185–1093.

Patent Abstracts of Japan, vol. 1996, No. 06, Jun. 28, 1996, & JP 08 050208A (Furukawa Electric Co.) Feb. 20, 1996.

* cited by examiner

*Primary Examiner*—Michael C. Zarroli
(74) *Attorney, Agent, or Firm*—Kenyon & Kenyon

(57) ABSTRACT

The present invention provides an optical communications link having at least one optical fiber, in particular for communications transmission, where the optical fiber is repeatedly bent. The fiber sections having a right-hand and left-hand curvature are distributed in such a way over the communications link that the average torsion of the fiber is approximately zero. The communications link in accordance with the present invention is compact, flexible, and variable in length. In addition, it reduces the sensitivity of the polarization state of the optical signal to changes in the form of the communications link.

11 Claims, 3 Drawing Sheets

OPTICAL COMMUNICATIONS LINK

FIELD OF THE INVENTION

The present invention relates to a movable optical communications link having at least one optical fiber; in particular, for use in transmitting information or performing interferometric measurements.

BACKGROUND OF THE INVENTION

Optical fiber links used to transmit information via light have significant advantages, both for long transmission links in telecommunications, as well as for short transmission links inside buildings, vehicles, and machines, not to mention in electronic calculating machines, since they ensure high data transmission density accompanied by low power losses. Due to their thin, flexible, but mechanically very durable construction, incoming optical fiber lines and outgoing optical fiber lines are beneficial, particularly for connecting optical sensors for measuring physical parameters, such as pressure and temperature, etc. In addition, unlike electrical connections, such optical fiber links cannot cause any electrical sparkovers or short circuits. The high transmission capacity of the optical fibers makes it possible to modify or replace the sensors and measuring devices without having to replace the communication links. This can result in considerable cost savings in vehicles, buildings, machines, or production facilities. There is often the need for optical fiber links to be mechanically movable, such as when installed in robots. Further, in buildings and vehicles, one frequently encounters motion among components due to strain or expansion.

Therefore, optical fiber links for transmitting information are always of great benefit when there is a need to transmit high information densities and a mechanically flexible connection is required, since the distance between the sender and receiver of the information varies as a function of time.

A difficulty that arises that significant changes in the position of the transmitter and/or of the receiver, and, in particular, in their relative distance spanned by optical communication links constituted as simple cable, can cause the entire system, such as a remote-controlled robot, to be obstructed by the requisite reserved length of cable. Individual components, which communicate with one another via an optical communications link, can become mechanically blocked by loops of cable. Another difficulty is that one can end up with a "cable salad".

Another difficulty encountered in response to variations in the position and distance of transmitters and/or receivers involves the nature of the optical transmission signal.

In communications transmissions of high quality and transmission frequency, it is necessary to control the polarization state of the optical information flow in the optical fiber, as well as in the other optical components. In the case of coherent transmissions, for example, phase-coherent mixing of the optical information flow with other light sources must be carried out. Such phase-coherent mixing is only optimal when the polarization states are substantially identical. When working with high bit-rate transmissions, the polarization mode dispersion of the fibers limits the reception quality, and transmission frequency can only be increased by carefully controlling the polarization. In many other optical components as well, the performance is a function of the polarization of the light.

Generally, the polarization state of the light in an optical fiber is not constant. Each glass fiber has a certain elliptical birefringence, so that the polarization of the light continually changes in the fiber. This variation propagates through to the end of the fiber, and, since it is dependent upon the spatial geometry of the fiber curve, the polarization state at the output end of a moving fiber varies with the motion.

In known methods this polarization effect can be avoided in that the optical communications transmission takes place in one of the intrinsic modes of a polarization-maintaining fiber. These polarization-maintaining fibers are characterized by pronounced birefringence, so that there is virtually no coupling over between the two polarization modes in the fiber. Since a change in the polarization of the light in an optical fiber is a phase shift effect between the intrinsic modes of the light, the polarization mode dispersion does not occur when the light in the fiber propagates through permanently in one intrinsic mode only.

The drawback of this method is that the polarization-maintaining fibers are expensive. Moreover, the light must be launched at the input ends of the polarization-maintaining fiber in a defined polarization state.

SUMMARY OF THE INVENTION

The present invention provides an optical communications link which can overcome the above-described difficulties and problems. To ensure a high transmission quality, the polarization state of the light should not depend substantially on changes in the form of the communications link and, therefore, on changes in the position of the transmitters and receivers. In addition, the communications link should be easily adaptable to changes in form, in particular to variations in length, but, it in this context, always be characterized by a straightforward arrangement.

In the present invention, the optical communications link having at least one optical fiber, in particular for communications transmission, where the optical fiber is repeatedly bent or curved and, in the process, can be wound in a helical shape, alternating as a right-hand and left-hand helix, fiber sections having a right and left curvature being distributed in such a way over the communications link that the average torsion of the fiber over the communications link is approximately zero.

The optical communications link of the present invention can be designed so that the sensitivity of the polarization state of the optical transmission signal to changes in the form of the communications link and, i.e., of the optical fibers, is substantially compensated. This is assured by the present invention in that the optical fiber is repeatedly bent, fiber sections having left-hand and right-hand curvature being distributed in such a way over the communications link that the average torsion of the fiber over the communications link is more or less zero. Preferably, this also holds for individual subsections of the fiber, so that left and right curvatures are uniformly distributed over the fiber. By preference, the fiber is wound in a helical shape, alternating with a right-hand and left-hand helix. Mixed forms having an even meander shape are also possible.

The present invention concerns the motion- and form-dependent birefringence of an optical fiber: the linear birefringence is heavily dependent upon the ellipticity are the fiber core, less heavily dependent upon the bend of the fiber, and hardly dependent upon the helical winding, given a large radius of the fiber. In contrast, the circular birefringence is hardly dependent upon the ellipticity of the fiber core and on the curve of the fiber, on the other hand, very heavily dependent upon the helical winding of the fiber. The main reason for the form dependency of the polarization state at the output end of an optical fiber is the considerable dependency of the fiber's optical activity upon the exact form of its helical windings. In the first approximation, this effect is achromatic and does not result in any polarization mode dispersion. It is caused by one of the so-called optical Berry phases, the "spin redirection phase" (R. Y. Chiao, Y. S. Wu, Phys. Rev. Lett. 57, 933 (1986)). This Berry phase (or geometric phase) is a phase effect produced by the structure of the fiber's space curve and not by an optical path, as is the case with the normal dynamic phase of the light. Nevertheless, with respect to interference of the light, geometric phases have the same properties as the normal dynamic phase.

The size of the spin redirection phase in a helically wound fiber is equivalent to the solid angle $\Omega$ that the k vector (k corresponds to the propagation constant β in the technical literature) wraps around on the sphere of the light-propagation orientations in the counter clockwise-direction when the light in the fiber is directed through a helical winding. The spin redirection phase is additive and changes its operational sign when the helical direction of the fiber changes, e.g., from the left-hand to the right-hand helix.

To minimize this form-dependent polarization effect, the fiber must be made up of wound fiber sections having alternating winding directions. As an example, the fiber sections are alternately wound to the right and to the left, the space angle, which wraps around the k vector in the left-hand wound sections, being equivalent to the space angle that the k vector wraps around in the right-hand wound sections. In the simplest case, the fiber alternately follows a right-hand and then a left-hand helix, each time with an equivalent length and winding; or right-hand and left-hand wound fiber sections of a fixed length alternate with each other.

In an embodiment of the present invention, to reduce the polarization dependency of changes in the form of the fiber link, the sections having right-hand and left-hand helical winding of the fiber should be distributed over the fiber in such a way that, in response to an altered fiber form, the changes $d\Omega_i$ in the solid angles $\Omega_i$ of the k vectors in the i-th fiber section add up to zero, thus to $\Sigma d\Omega_i=0$.

The variation in the polarization of an optical signal at the output end of a moving optical communications link having one optical fiber is advantageously reduced in that the optical fiber is repeatedly bent, fiber sections having a right and left curvature being distributed in such a way over the communications link that the average torsion of the fiber over the communications link is approximately zero.

In order to minimize the variation in polarization in the case of changes in the form of only one fiber section, the optical fiber is preferably bent in such a way that the torsion of the subsection averaged over subsections of the communications link is approximately zero. In this context, a subsection is a fiber section which is at least sufficiently long to contain right-hand and left-hand fiber segments, e.g., two successive, individual right-hand and left-hand windings, the torsion of the two sections canceling each other.

In an embodiment of the present invention, the optical fiber can be coiled with alternating winding direction around an even number of, preferably two, side-by-side carrier elements. In this context, one or a plurality of left-hand windings around one of the carrier elements can follow the corresponding number of right-hand windings around another carrier element.

Another embodiment of the communications link provides for two helically wound optical fibers (1, 3, 6) having different winding directions in order to direct the light in the forward and return directions.

In this further embodiment, the communications link has at least two helically wound optical fibers having different winding directions to direct the light in the forward and return directions. In this context, both optical fibers can be advantageously wound around the same carrier element, the outer winding of the two windings having a somewhat larger coil pitch, so that, in terms of absolute value, the torsion of the forward and return line is more or less equivalent, but with different operational signs.

In a further embodiment of the present invention, the communications link permits the transmission of information in moving fibers, with a substantially reduced polarization variation at the output end.

To minimize the effects of the bending- and stress-induced birefringence of the fiber material on the polarization state of the transmission signal, too small of a winding radius for the optical fibers should not be selected. Preferably, the winding radius for the optical fibers should be to at least about 2 cm, or to at least about 3 cm.

In a further embodiment of the present invention, the optical fiber can be joined to an elastic carrier material, which, in response to mechanical loading, can permit a change in the form of the transmission line and, in response to the lack of a mechanical load, can retain the optical fiber in its initial curved form.

This communications link of an embodiment of the present invention can make it possible to establish a connection that is compact, yet movable and variable in length, for transferring optical data between a transmitter and a receiver. In this manner, any mechanical hindrance to the overall device, including the transmitter, receiver and communications link, can be minimized. And, the output signal can be substantially insensitive to any changes in the form of the communications link.

In a further embodiment of the present invention, the optical fiber can be wound in a helical shape, e.g., in the manner of a telephone cable. In response to stress in the longitudinal direction of the helix, i.e., of the meander shape, the communications link can be pulled apart in an accordion-like fashion, and, in response to cancellation of the stress, again assumes its compact, initial form.

In another embodiment of the present invention, the optical fiber can be wound around at least one elongated carrier element, such as a cylinder. The carrier element is preferably flexible. As an example, the carrier element is a flexible bar.

To realize and stabilize its curved form, the fiber is preferably secured to the carrier element in such a way that it is movable in its wound form, but remains stabilized on the carrier element, e.g., in that it is flush mounted on the carrier element or embedded between the carrier element and a cladding material.

DETAILED DESCRIPTION

Figure 1:
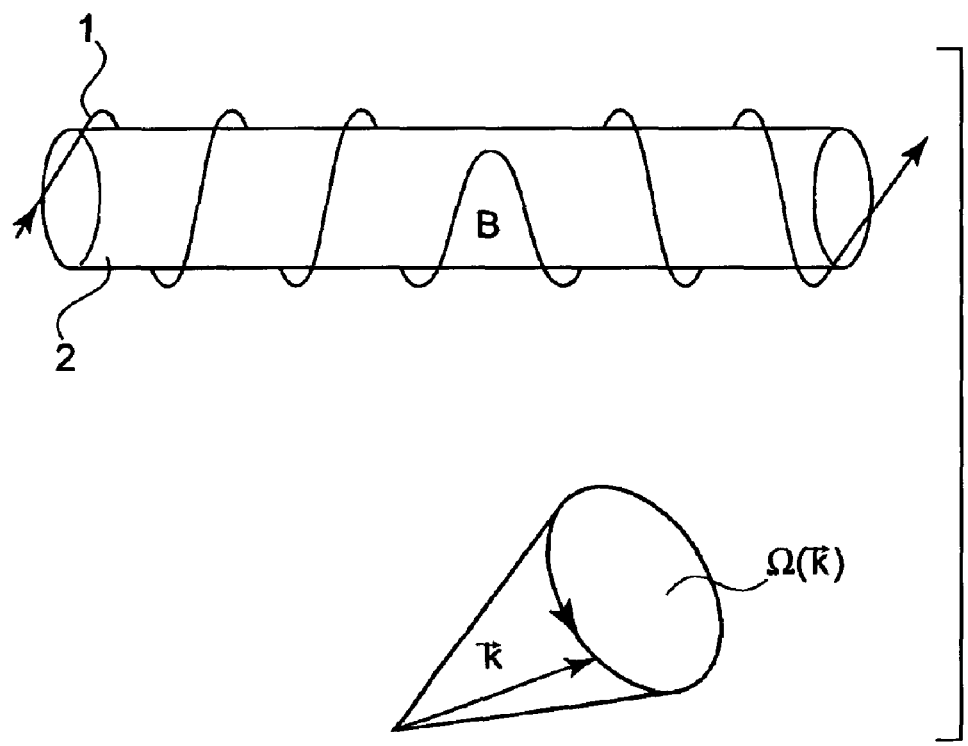
FIG. 1 shows an example of the transmission lines according to an embodiment of the present invention for reducing the influence of form on the polarization of the output signal.
Figure 2A:
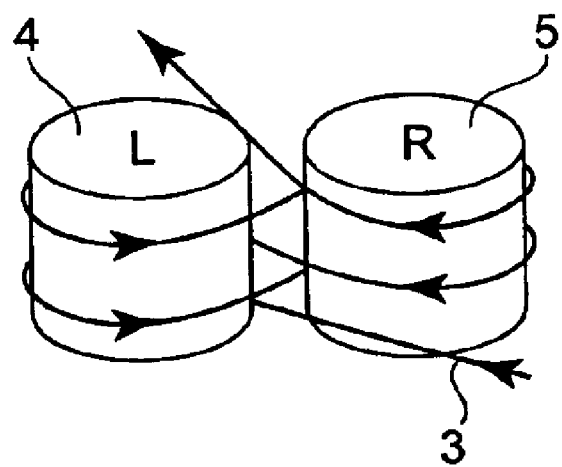
FIG. 2A shows an example of the transmission lines according to an embodiment of the present invention for reducing the influence of form on the polarization of the output signal.
Figure 2B:
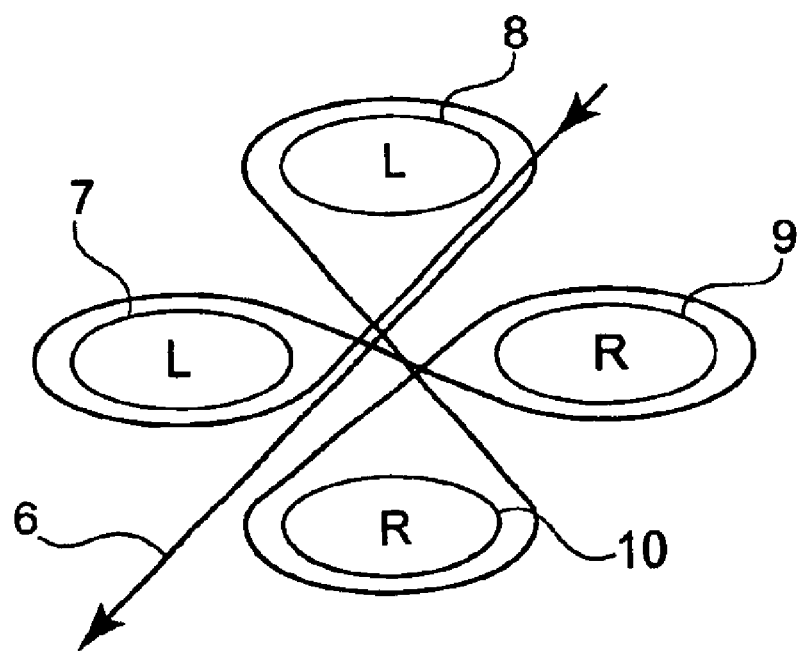
FIG. 2B shows an example of the transmission lines according to an embodiment of the present invention for reducing the influence of form on the polarization of the output signal.
Figure 3:
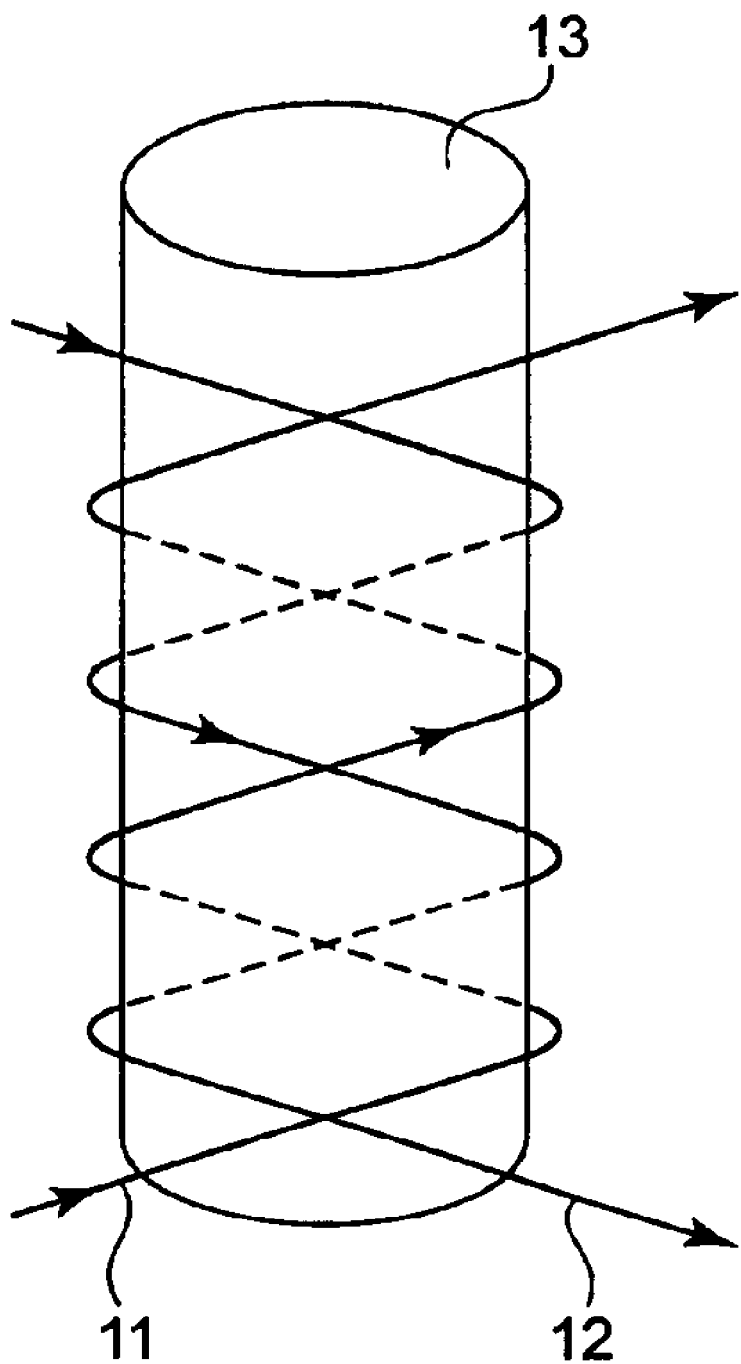
FIG. 3 shows an example of the transmission lines according to an embodiment of the present invention for reducing the influence of form on the polarization of the output signal.

FIGS. 1 through 3 illustrate examples of transmission lines according to embodiments of the present invention which are compact, movable, and flexible. Furthermore, the transmission lines are designed to minimize the influence of the transmission lines' form on the polarization of the output signal. Thus, they are especially suited for linking optical transmitters and receivers, which are movable with respect to one another, for purposes of data communications.

The top part of FIG. 1 shows a detail of such a communications link, which is made up of a cylinder 2, as a carrier material or carrier element, and of an optical fiber 1. Optical fiber 1 is helically wound around cylinder 2, the direction of the helical winding changing, for instance, in the middle of the cylinder at point B. Thus, in the left part of the communications link, the torsion of the optical fiber is negative, in the right part, positive, so that the average torsion is more or less zero.

To change the direction of the helical winding on a cylinder, an arc B should be wound. This arc can be secured, together with the remaining right- and left-hand winding, for example, by adhesive or by tying it to the cylinder, since otherwise it would become detached.

To manufacture a long communications link, a plurality of line segments can be joined to one another, as shown in FIG. 1. The depicted fiber segment is then a subsection, in which the average torsion is approximately zero.

In the lower part of FIG. 1, the k vector of the light launched into the fiber and the corresponding solid angle $\Omega$ are shown. If r(s) denotes the space curve described by the fiber as a function of the arc length s, then solid angle $\Omega$ can be derived as a measure for the Berry phase from the torsion $\tau$ of the space curve, as follows ($s_1$, $s_2$ denote the beginning and end, respectively, of the fiber):

$$\int_{s1}^{s2} \tau(s)ds = \Omega \propto \Phi_{Berry},$$

where k(s1)=k(s2)

Two further embodiments of communications links or of sections thereof, in accordance with the present invention, are shown in FIG. 2. In FIG. 2A, optical fiber 3 is doubly wound over two cylinders 4, 5. Around cylinder 4, fiber 3 describes a left-hand winding (L), around cylinder 5, a right-hand winding (R). By alternating the two cylinders, a right-hand helical winding and a left-hand helical winding can always alternate with one another.

In this context, glass fiber 3 is embedded, similarly to a telephone line, in a material which has dimensional stability, but is highly elastic, so that the incoming line can be pulled apart in accordion-like fashion, but contracts again when the tensional force subsides. In addition, cylinders 4, 5 can themselves be resilient to facilitate a lateral motion of the communications link.

The optical signal can be conducted in the reverse direction through the same glass fiber, however, over a different spectral channel, for example. Since the geometric phase is achromatic, and a right-hand helix (or left-hand helix) remains a right-hand helix (or left-hand helix) when it is propagated through in the opposite direction, the same compensation effect occurs for the optical forward and reverse line as does for the form-dependent polarization fluctuations in the present invention.

In place of two cylinder windings of fiber 3 as shown in FIG. 2A, the fiber 6 can also be routed over more cylinders, i.e., four cylinders 7, 8, 9, 10. This is shown in FIG. 2B. In the case of FIG. 2B, right-hand and left-hand loops alternate, each characterized by R or L.

It is also possible for a plurality of left-hand loops to follow a plurality of right-hand loops in that the fiber is repeatedly wound around a cylinder before it is routed to the next cylinder with an opposite winding direction. It is crucial here that the formula $\Sigma d\Omega_i=0$ remain satisfied, and that the torsion of the entire optical fiber be compensated.

The achromaticity of the geometric phase makes it possible to use both white light sources, as well as more or less monochromatic light sources.

In the case that the light is directed in the forward and reverse direction through the same communications link, one can configure two cylinder windings side-by-side, one of these, a right-hand helix, functioning as an incoming line, and the other, a left-hand helix, as a return line. The flexible claddings, which determine the form elasticity of the line, can be configured separately from one another. However, the flexible claddings of an embodiment of the present invention, are designed as contiguous claddings. This can prevent them from separating from another, thereby permitting them to jointly participate in the motion of the line, substantially identically.

In such a case of a single right-hand helix as a forward (reverse) line and of a single left-hand helix as a reverse (forward) line, the two elastic helical windings 11, 12 can also be wound, one over another, on a single cylinder 13, as shown in FIG. 3. Since the outer winding has a somewhat larger diameter, its pitch should be somewhat greater than that of the inner winding, in order to satisfy the condition $\Sigma d\Omega_i=0$.

The incoming and outgoing lines described here can be used, for example, to freely span the distance between a stationary base station, e.g., the measuring or control unit, and the movable sensor, e.g. a telephone receiver or another sensor; or they are supported by tubes or wires using pull or tension rollers. In this manner, the dependency of the polarization of the transmitted light on the motion of the line is reduced. It is also beneficial to use lines of the described type having alternating helical winding to provide movable connections of various cable links in the telecommunication nodal points with the aid of short glass fiber lines equipped with plug connectors. These freely movable lines then introduce a substantially smaller time-related polarization change into the information flow of the transmission link than do the customary loop-type lines. Moreover, they reduce the "cable salad".

The present invention has industrial applicability in all fields in which optical signals are transmitted via optical fiber links. Embodiments of the present invention can be used for systems having transmitters and receivers of optical signals which experience relative positional changes, and where the quality of the transmission signal is often degraded by changes in the form of the transmission link.

What is claimed is:

1. An optical communications link comprising:
    an optical fiber for transmitting information, the optical fiber having a plurality of fiber sections, each fiber section of the plurality of fiber sections being configured to have at least one of a right-hand curvature and a left-hand curvature, the optical fiber being bent repeatedly so that the plurality of fiber sections having a right-hand curvature and a left-hand curvature are distributed over the optical communications link so that an average torsion of the optical fiber over the optical communications link is about zero, wherein the optical fiber is bent so that a torsion of the fiber section of the plurality of fiber sections averaged over a total subsections of the communications link is about zero.

2. An optical communications link comprising:

an optical fiber for transmitting information, the optical fiber having a plurality of fiber sections, each fiber section of the plurality of fiber sections being configured to have at least one of a right-hand curvature and a left-hand curvature, the optical fiber being bent repeatedly so that the plurality of fiber sections having a right-hand curvature and a left-hand curvature are distributed over the optical communications link so that an average torsion of the optical fiber over the optical communications link is about zero, wherein the optical fiber is wound in a helical shape, alternating with a right-hand and left-hand winding helix, wherein the right-hand and left-hand winding helix includes a right-hand helical winding and a left-hand helical winding so that the right-hand helical winding follows and alternates with the left-hand helical winding, a right length of the right-hand helical winding corresponding to a left length of the left-hand helical winding.

3. An optical communications link comprising:

an optical fiber for transmitting information, the optical fiber having a plurality of fiber sections, each fiber section of the plurality of fiber sections being configured to have at least one of a right-hand curvature and a left-hand curvature, the optical fiber being bent repeatedly so that the plurality of fiber sections having a right-hand curvature and a left-hand curvature are distributed over the optical communications link so that an average torsion of the optical fiber over the optical communications link is about zero, and an elastic carrier material, the elastic carrier material being joined to the optical fiber so that a form change of a transmission line is permitted and so that in response to no mechanical load the transmission line retains the optical fiber in its initial curved form, the transmission line configured as a plurality of the optical fibers.

4. An optical communications link comprising:

an optical fiber for transmitting information, the optical fiber having a plurality of fiber sections, each fiber section of the plurality of fiber sections being configured to have at least one of a right-hand curvature and a left-hand curvature, the optical fiber being bent repeatedly so that the plurality of fiber sections having a right-hand curvature and a left-hand curvature are distributed over the optical communications link so that an average torsion of the optical fiber over the optical communications link is about zero, a carrier element, the carrier element being an at least one of an elongated carrier element and a cylinder, the optical fiber being wound around the carrier element, wherein the at least one of the elongated carrier element and the cylinder is flexible.

5. An optical communications link comprising:

an optical fiber for transmitting information, the optical fiber having a plurality of fiber sections, each fiber section of the plurality of fiber sections being configured to have at least one of a right-hand curvature and a left-hand curvature, the optical fiber being bent repeatedly so that the plurality of fiber sections having a right-hand curvature and a left-hand curvature distributed over the optical communications link is about zero; and a carrier element, the carrier element being an at least one of an elongated carrier element and a cylinder, the optical fiber being wound around the carrier element, wherein the optical fiber is secured to the carrier element so that the optical fiber is movable and still stabilized on the carrier element.

6. An optical communications link comprising:

an optical fiber for transmitting information, the optical fiber having a plurality of fiber sections, each fiber section of the plurality of fiber sections being configured to have at least one of a right-hand curvature and a left-hand curvature, the optical fiber being bent repeatedly so that the plurality of fiber sections having a right-hand curvature and a left-hand curvature are distributed over the optical communications link so that an average torsion of the optical fiber over the optical communications link is about zero, a carrier element, the carrier element being an at least one of an elongated carrier element and a cylinder, the optical fiber being wound around the carrier element, and a cladding material, the optical fiber being at least one of flush mounted on the carrier element and embedded between the carrier element and the cladding material, wherein the optical fiber is secured to the carrier element so that the optical fiber is movable and still stabilized on the carrier element.

7. An optical communications link comprising:

an optical fiber for transmitting information, the optical fiber having a plurality of fiber sections, each fiber section of the plurality of fiber sections being configured to have at least one of a right-hand curvature and a left-hand curvature, the optical fiber being bent repeatedly so that the plurality of fiber sections having a right-hand curvature and a left-hand curvature are distributed over the optical communications link so that an average torsion of the optical fiber over the optical communications link is about zero, and a carrier element, the carrier element being an at least one of an elongated carrier element and a cylinder, the optical fiber being wound around the carrier element, wherein the optical fiber is coiled with an alternating winding direction around one of two carrier elements disposed side-by-side and an even number of the carrier elements disposed side-by-side.

8. An optical communications link comprising:

an optical fiber for transmitting information, the optical fiber having a plurality of fiber sections, each fiber section of the plurality of fiber sections being configured to have at least one of a right-hand curvature and a left-hand curvature, the optical fiber being bent repeatedly so that the plurality of fiber sections having a right-hand curvature and a left-hand curvature are distributed over the optical communication link so that an average torsion of the optical fiber over the optical communications link is about zero, and a carrier element, the carrier element being an at least one of an elongated carrier element and a cylinder, the optical fiber being wound around the carrier element, wherein a left-number of the left-hand windings around a first of the carrier elements is equivalent to a right-number of the right-hand windings around a second of the carrier elements.

9. An optical communications link comprising:

a first optical fiber for transmitting information, the first optical fiber having a first plurality of fiber sections, each fiber section of the plurality of fiber sections being configured to have at least one of a first right-hand curvature and a second left-hand curvature, the first optical fiber being bent repeatedly so that the first plurality of fiber sections having a first right-hand curvature and a first left-hand curvature is distributed over the optical communications link so that a first average torsion of the first optical fiber over the optical communications link is about zero;

a second optical fiber for transmitting information, the second optical fiber having a second plurality of fiber sections, each fiber section of the second plurality of fiber sections being configured to have at least one of a second right-hand curvature and a second left-hand curvature, the second optical fiber being bent repeatedly so that the second plurality of fiber sections having a second right-hand curvature and a second left-hand curvature are distributed over the optical communications link so that a second average torsion of the second optical fiber over the optical communications link is about zero;

the first and second optical fibers being helically wound and having different winding directions so that the first optical fiber directs light in a forward direction and the second optical fiber directs light in a return direction.

10. The optical communications link as recited in claim 9, wherein the first optical fiber and the second optical fiber are wound around the same carrier element producing an outer winding of a larger coil pitch than an inner winding so that a first torsion of a forward line of the first optical fiber is similar in magnitude to a second torsion of a return line of the second optical fiber, the first torsion and the second torsion having different operational signs.

11. The optical communications link as recited in claim 9, wherein the optical fiber has a winding radius of one of greater than 2 cm and greater than 3 cm.

* * * * *